United States Patent [19]
Carson

[11] 3,818,938
[45] June 25, 1974

[54] FLUID MIXING APPARATUS
[75] Inventor: Don B. Carson, Mount Prospect, Ill.
[73] Assignee: Universal Oil Products Company, Des Plaines, Ill.
[22] Filed: Oct. 16, 1972
[21] Appl. No.: 298,073

[52] U.S. Cl................. 137/604, 23/285, 239/427.5
[51] Int. Cl............................................ F16k 19/00
[58] Field of Search................ 137/604; 239/427.5; 23/285, 288 R

[56] References Cited
UNITED STATES PATENTS

| | | | |
|---|---|---|---|
| 2,143,817 | 1/1939 | Longdin et al.................... | 239/427.5 |
| 1,702,373 | 2/1929 | Alexander..................... | 239/427.5 X |
| 3,154,103 | 10/1964 | Davis et al...................... | 137/604 X |
| 3,166,382 | 1/1965 | Purse et al. ........................ | 23/288 R |
| 3,326,472 | 6/1967 | Gjerde ............................. | 239/427.5 |
| 3,475,508 | 10/1969 | King............................. | 23/288 R X |

Primary Examiner—Robert G. Nilson
Attorney, Agent, or Firm—James R. Hoatson, Jr.; Robert W. Erickson; William H. Page, II

[57] ABSTRACT

An apparatus for mixing two fluids and injecting the resulting mixture of the two fluids into a third circulating fluid. The apparatus comprises essentially inner and outer tubes concentrically arranged to form an injection nozzle which itself is placed within a circulating conduit. The inner tube and the outer tube have ports located on their side walls to allow the passage of a fluid through the first tube into the second tube along with fluid passing through the second tube forming a mixture which mixture leaves the outer tube through ports thereon and enters the circulation vessel. The invention can be utilized in such processes as hydrofluoric or sulfuric acid alkylation of hydrocarbons.

6 Claims, 2 Drawing Figures

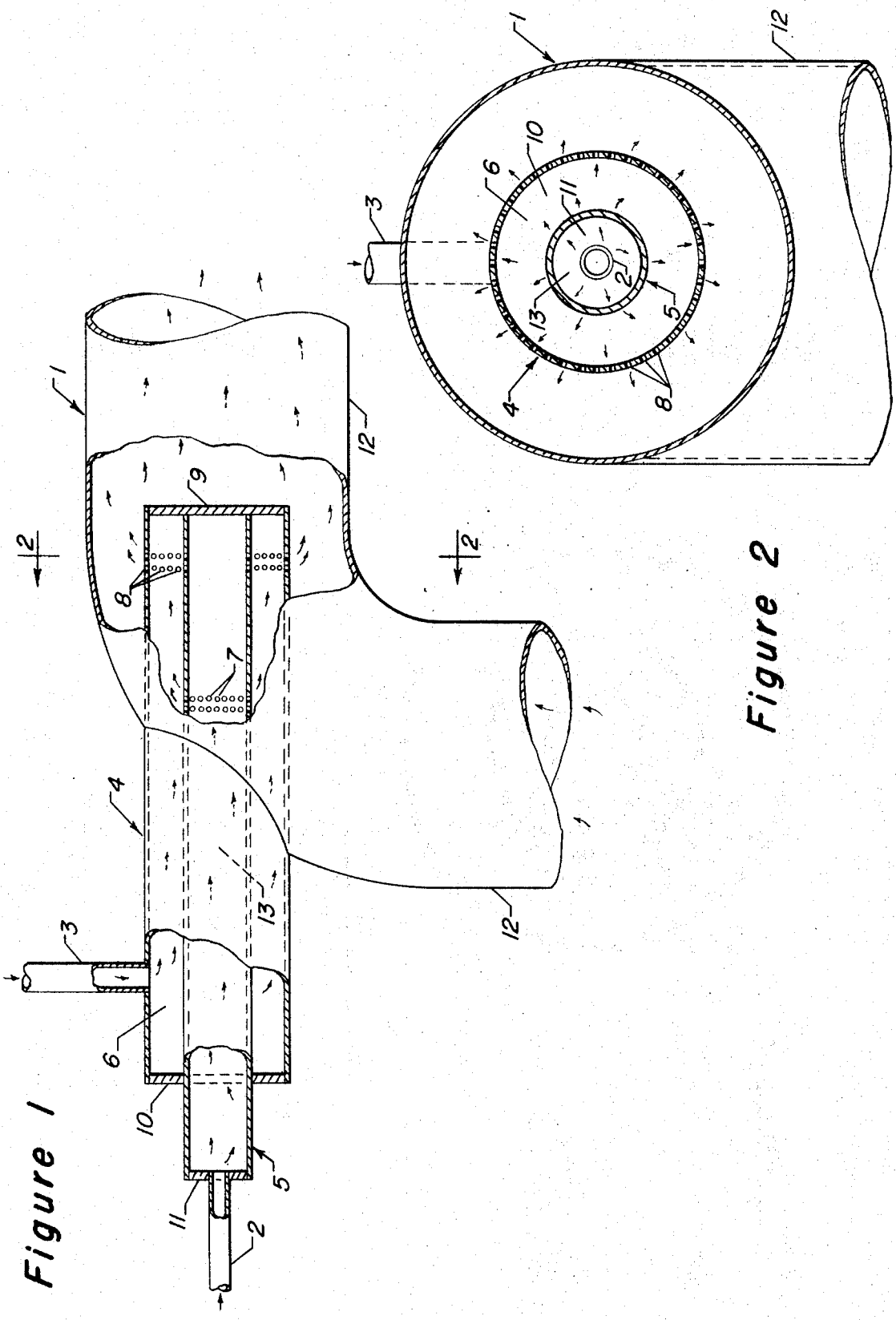

FLUID MIXING APPARATUS

BACKGROUND OF THE INVENTION

1. Field of the Invention

The field of art to which this invention pertains is mixing nozzle apparatus. More particularly this invention resides in the area of alkylation apparatus nozzles, which subject matter can be found in U.S. Patent Office Classifications such as Cl. 23–288 or Cl. 239–423 through 425.

2. Prior Art

The prior art relating to this invention resides in the above mentioned General United States Patent Office Classifications. The improvement in my apparatus is particularly applicable to hydrofluoric acid alkylation apparatus where the presence of liquid phase hydrofluoric acid in an isoparaffin stream before the isoparaffin and olefin are contacted and mixed with each other would lead to undesirable results. It is thought that the olefins might polymerize if they contacted pockets of acid before the olefins are dispersed in the isoparaffin.

The apparatus of my invention accomplishes the mixing of the olefin and isoparaffin streams in a minimum of time with the resultant mixture of olefins and isoparaffins injected into a vessel which contains a circulating stream of alkylating acid. My invention prevents the occurance of undesirable side reaction by allowing the mixing of isoparaffins and olefins quickly and prior to their contact with alkylating acid catalyst.

BRIEF SUMMARY OF THE INVENTION

My invention can be briefly described as an apparatus for mixing two fluids and injecting the resulting mixture into a third fluid which passes through a circulating vessel. The essential components of my apparatus comprise concentrically positioned tubes having ports in them to allow passage of a fluid through an inner tube through its respective ports and into the inside of an outer tube through which passes a second fluid which then mixes with the material leaving the inner tube, the resulting mixture passes through the ports of the outer tube and into the circulating vessel.

In a broad embodiment, my invention resides in an apparatus for mixing two fluids and injecting the resulting mixture into a third fluid which comprises: an inner tube and an outer tube concentrically arranged to form an annular volume located between the inside of the outer tube and the outside of the inner tube, said inner and outer tubes having one end of each adjacent to each other, said ends being sealed, outlet port means located on said outer tube positioned adjacent to said sealed end of said outer tube, outlet port means located on said inner tube, said port means positioned on said inner tube a longitudinal distance from said sealed end of said inner tube so that said port means on said inner tube is farther from the sealed end of said outer tube when measured longitudinally on said outer tube than said port means on said outer tube is from its said sealed end; first fluid inlet means connected to said inner tube to allow said first fluid to flow into said inner tube and through said inner tube port means; second fluid inlet means connected to said outer tube to allow said second fluid to flow into said outer tube through said annular volume and through said outer tube port means, said outer and inner tube configuration being connected to a circulation vessel means to allow said outer tube port means to be in communication with a third fluid passing through said circulation vessel; whereby a first fluid passes into said inner tube through said inlet means out of said inner tube via said port means to be contacted and mixed in said annular volume with a second fluid flowing through said annular volume, the resultant mixture being passed through said outer tube port into said circulation vessel to contact a third fluid passing through said circulation vessel.

BRIEF DESCRIPTION OF THE DRAWING

The attached drawing shows an overall sketch of a preferred embodiment of my apparatus as shown in FIG. 1 together with a sectional view of that embodiment as shown in FIG. 2.

Starting with FIG. 1 there is shown a circulation vessel means 1 which, as shown in the drawing, is a relatively large conduit through which an emulsion or mixture may be circulated by such circulation means as pumps or compressors. Circulating material flows past the injecting nozzle portion of the apparatus in an upward to a side ways position. Shown connected to the circulation vessel means 1 are inner tube 5 and outer tube 4 which are concentrically aligned and horizontally positioned so that they pass into the circulation vessel conduit 1 as shown. Located on the inner tube 5 and the outer tube 4 within the circulation vessel conduit 1 is plate 9 which seals the inner tube from the outer tube and both tubes from the inside volume 12 of the circulation vessel means. Volume 13 is the volume located within the inner tube 5. Annular volume 6 is the volume located within the outer tube 4 between the inside walls of the outer tube 4 and the outside walls of the inner tube 5.

Shown attached to the inner tube 5 is a plate 11 which connects the inner tube with a fluid inlet means 2. The fluid input means is a pipe or other fluid carrying vessel which can allow fluid to flow from an external supply source into the inner volume 13 within tube 5.

Shown attached to the inner tube and the outer tube is plate 10 which seals the portion of the two tubes that extends outside the circulation vessel conduit 1. Plate 10 is securely fastened to the outer tube and seals against the inner tube to form a fluid tight seal so that fluid may not leak out of the outer tube. Shown attached to outer tube 4 is a second fluid inlet means 3 which is attached to fluid supply means to allow passage of a second fluid into the annular volume 6 between the two concentric tubes.

The heart of my apparatus is shown by fluid outlet ports 7 and 8. Fluid outlet ports 7 are holes which are drilled into side walls of the inner tube 5 to allow the passage of fluid from the inside of that tube through these ports and into the annular volume 6. Shown on outer tube 4 are fluid outlet ports 8 which are holes drilled into the side walls of the outer tube and which allow the passage of fluid from within annular volume 6 within the outer tube through these ports and into circulating vessel means 1. It is required that the fluid outlet ports for the inner and outer tubes be so positioned that when proceeding in a downstream direction with the fluid flow in the outer conduit, the fluid outlet ports on the inner conduit are upstream with respect to the fluid outlet ports on the outer tube.

FIG. 2 shows a sectional view of the apparatus shown in FIG. 1. Shown in FIG. 2 are circulation vessel means 1 along with inner tube 5 and outer tube 4. Shown within inner tube 5 is the inner tube volume 13 and annular volume 6 which is located between the inside walls of the outer tube 4 and the outside walls of the inner tube 5. Shown on the inner tube are the fluid outlet ports 7 which are axially aligned from the center axis of the inner tube. Fluid outlet port 8 and the outer tube are similarly situated.

The overall flow in the apparatus when constructed according to the definition as claimed is such that a fluid passes into the inner tube while a second fluid passes through the outer tube. Another fluid passes through fluid circulation vessel means 1. The fluid passing through the inner tube passes out of the outlet ports on that tube to be intimately contacted and mixed with a second fluid passing through the annular portion located within the outer tube. The resultant mixture then passes out of the outlet ports of the outer tube to be contacted with another fluid passing through circulation vessel means conduit 1.

DETAILED DESCRIPTION OF THE INVENTION

My apparatus can be used in such processes as sulfuric or hydrofluoric acid hydrocarbon alkylation or any other type fluid contacting process in which two fluids are desired to be mixed together before they contact a third fluid in a zone in which the third fluid is circulated.

The inner and outer tubes used in my apparatus can be any type of an enclosed conduit such as cylindrical pipes or other shaped conduits which are constructed in order to carry the respective fluids through each of the conduits. Specifically, the inner tube is preferably an elongated pipe as is the outer tube. The placement of the inner and outer tubes is such that they are axially aligned so that their concentric formation forms an annular volume between the inside of the outer tube and the outside of the inner tube. Fluid inlet means can be connected to the inner and outer tubes in a manner so that independent flow of fluid through the inner and outer tubes may be regulated. Preferably, the inner tube extends a distance outside the outer tube at the end of the tubes not within the fluid circulation vessel means 1. This extension can be utilized to have fluid input means which carry fluid to be passed into the inner tube to be connected at this point to the inner tube. Preferably located on one end of the outer tube is a vertical plate which connects the inner and outer tubes so that the annular volume between the inner and outer conduit can be sealed off from the atmosphere.

In placing the inner and outer tubes it is especially preferred that one end of both tubes be adjacently positioned with a single vertical or horizontal plate connecting and sealing the adjacent ends of the inner and outer tubes. This can be done by cutting off the inner and outer tubes in a singular vertical plane and welding or securely fastening a plate across the open ends of the inner and outer tubes. By using this sealing means the inner and outer tubes form an annular space which annular space is sealed off from the inner tube and the circulation vessel.

The fluid circulation vessel is preferably an elongated conduit having a larger diameter than the above described outer tube. It is preferred that the circulation vessel conduit be in contact or communication with a pumping means such as positive or positive displacement pump or a centrifical pump in order that a fluid may be circulated at a reasonably high rate through this conduit. When circulation occurs, the fluids which pass out of the outer tube are intimately mixed with the fluids passing through the circulation vessel conduit. Preferably the circulation vessel conduit has an approximately right angle turn or sharp elbow located where the two above mentioned concentric tubes are inserted into it. This preferred placement is the one that is shown as the preferred embodiment in FIG. 1 and is believed to present the combination of apparatus in which efficient and complete mixing will take place.

The outlet port means should be located on both the inner and outer tubes of the apparatus. It is required that the outlet port means on the inner tube be located a given distance upstream with respect to fluid flow in the outer tube from the outlet ports on the outer tube so that proper mixing of the fluid passing through the port means on the inner tube with fluid passing through the annular volume between the tubes can take place. The then mixed fluids can pass through the ports on the outer tube into the circulation vessel. FIG. 1 shows the preferred arrangement of the fluid outlet ports on the inner and outer conduits. The illustrated arrangement of outlet port means on the inner and outer tubes is required so that when describing the fluid flow in my apparatus a fluid flowing through the inner tube passes through that tube and out of the outlet ports into the annular volume between the inner and outer tubes. The fluid passing into this annular volume from the outlet port means on the inner tube is commingled with a fluid passing through the annular volume through the outer tube. The two mixtures are essentially mixed in the annular volume and then passed through the outlet port means of the outer tube into the circulation vessel conduit.

In an alternate embodiment the inner tube may have its sealed end positioned so that it is not adjacent to the end of the outer tube located within the circulation vessel. In these instances the sealed end of the inner tube closest to the outlet port means on the inner tube will create a large void volume within the outer tube present between the sealed end of the inner tube and the sealed end of the outer tube. This may be used as one embodiment of my invention but it is not preferred, since the void volume may prevent efficient mixing of the fluid in the annular volume. The extra volume would most likely reduce the fluid velocities in the annular volume thereby reducing the possibility of good mixing.

The outlet port means located on the inner and outer conduits can be any type of openings which are easily machined or placed upon the inner and outer conduits. The configuration or shape of the outlet port means on the inner and outer tubes preferably should be the same but can be different in actual area. The outlet port means can also be of different configuration. In a preferred manner one or more rings of holes are placed on the inner tube along with one or more rings of holes placed on the outer tube. Slots may be utilized or other types of void spaces used as outlet ports means. The sizes of the outlet port means on the inner tube and the outer tube should be chosen to account for design flow rates with reasonably acceptable pressure drops.

It is also possible that the inner conduit may have one of its ends sealed quite close to its outlet port means with the remainder of the inner tube comprising a dead volume. This dead volume may extend to the outer tube end to take up space within the outer tube to form an annular volume between the outside of this volume and the inside of the outer tube. This type of an arrangement may be preferred where it is desired to maintain a small annular volume to keep reasonably high flow rates of fluid within this volume.

The sizes of the inner and outer tubes can vary and are limited only by the methods of fabrication or process use. In a similar manner the circulating vessel conduit can also be of any dimension. It is preferable however that the circulation vessel conduit have a larger diameter than the diameter of the outer conduit in order to allow the two concentric tubes to be extended into the inner conduit while allowing fluid flow to take place within the circulation vessel conduit.

The materials of the construction which can be utilized in my apparatus are primarily metals but other material such as plastics may be utilized. My apparatus is applicable to any type of process in which two fluids are desired to be mixed prior to their mixing with a third fluid. Methods of controlling the pressure drops within the various portions of my apparatus or the flow rates of fluids through my apparatus or the temperature or pressures therein are not described but are thought to be well known to those well versed in the art.

I claim as my invention:

1. An apparatus to be used for mixing two fluids and injecting the resulting mixture into a third fluid which comprises:
   a. an inner tube and an outer tube concentrically arranged to form an annular volume located between the inside of the outer tube and the outside of the inner tube, said inner and outer tubes having one end of each adjacent to each other, said ends being sealed;
   b. outlet port means located on said outer tube positioned adjacent to said sealed end of said outer tube;
   c. outlet port means located on said inner tube, said port means positioned on said inner tube a longitudinal distance from said sealed end of said inner tube so that said port means on said inner tube is farther from the sealed end of said outer tube when measured longitudinally on said outer tube than said port means on said outer tube is from its said sealed end whereby to form an annular mixing chamber between said respective outlet port means;
   d. first fluid inlet means connected to said inner tube to allow a first fluid to be passed into said inner tube and through said inner tube port means;
   e. second fluid inlet means connected to said outer tube to allow a second fluid to be passed into said outer tube through said annular volume and through said outer tube port means, said outer and inner tube configuration being connected to a circulation vessel means to allow said outer tube port means to be in communication with a third fluid to be passed through said circulation vessel means; whereby a first fluid can pass into said inner tube through said inlet means out of said inner tube via said port means and can be contacted and mixed in said annular volume with a second fluid which can flow through said annular volume, the resultant mixture can be passed through said outer tube port into said circulation vessel to contact a third fluid which can pass through said circulation vessel means.

2. Claim 1 in that said circulation vessel means comprises a fluid conduit.

3. Claim 1 in that said port means are openings located on side walls of said tubes.

4. An apparatus for mixing two fluids and injecting the resultant mixture into a third fluid which comprises:

a. a circulation vessel means to allow the circulation of a fluid there through;
   b. an outer fluid transfer tube connected to said circulation vessel means, said tube having one end sealed off with outer tube port means located on said tube adjacent to said sealed end, said tube extending into said circulation vessel to allow said port means to be in communication with an inside of said circulation vessel means;
   c. fluid inlet means connected to said outer fluid tube to allow the flow of a fluid into said tube through a herein below described annular volume and out of said port means into said circulation vessel;
   d. an inner fluid transfer tube concentrically located within said outer tube to form an annular volume located between the inside of said outer tube and the outside of said inner tube, said inner tube having one end sealed off, with the respective sealed ends of said inner and outer tubes adjacently positioned, port means located on said inner tube so that when proceeding along a longitudinal axis of said concentric tubes from the sealed end of the outer tube the port means of said outer tube are closer to its said end than the port means of said inner tube to thereby provide an annular mixing chamber between said respective port means;
   e. fluid inlet means connected to said inner fluid transfer tube to allow the flow of a fluid into said inner fluid transfer tube and through said inner tube port means; whereby a fluid can flow into said inner tube through said port means on said inner tube and be mixed in said annular volume with fluid flowing through said outer tube, the resulting admixture can be passed through said port means on said outer tube to be contacted with a fluid which can circulate through said circulation vessel.

5. Claim 4 wherein said circulation vessel comprises a conduit having a fluid pumping means attached thereto.

6. Claim 4 wherein port means are openings located on side walls of said tubes.

* * * * *